April 8, 1958  J. G. JARVIS  2,829,690
UNITARY ROTARY STRAW CUTTER AND COOPERATING ROLLER
Filed Nov. 16, 1955  5 Sheets-Sheet 1

Inventor
JAMES G. JARVIS
by: J. Richard Cavanagh

April 8, 1958          J. G. JARVIS          2,829,690
UNITARY ROTARY STRAW CUTTER AND COOPERATING ROLLER
Filed Nov. 16, 1955          5 Sheets-Sheet 2

Inventor
JAMES G. JARVIS

April 8, 1958          J. G. JARVIS          2,829,690
UNITARY ROTARY STRAW CUTTER AND COOPERATING ROLLER
Filed Nov. 16, 1955                        5 Sheets-Sheet 3

Inventor
JAMES G. JARVIS
by: J. Richard Cavanagh

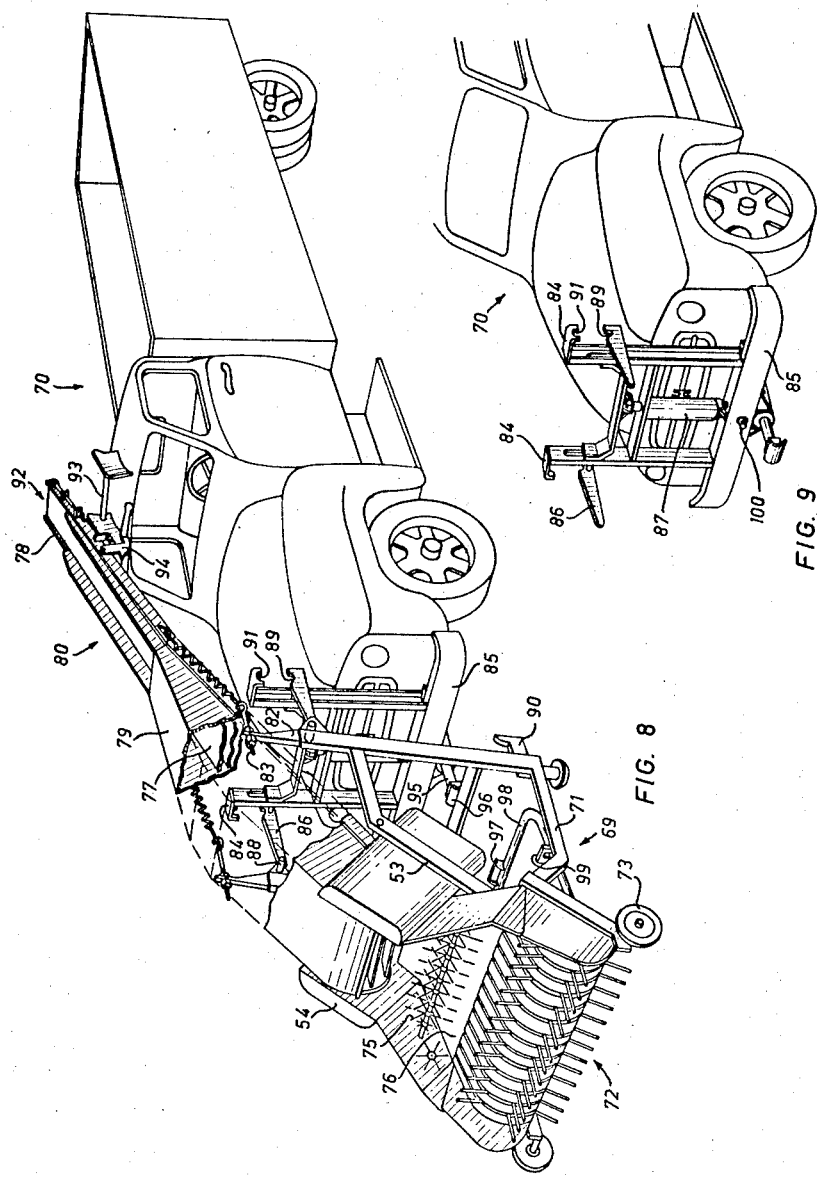

@@@ # United States Patent Office

2,829,690
Patented Apr. 8, 1958

---

2,829,690

UNITARY ROTARY STRAW CUTTER AND COOPERATING ROLLER

James Gordon Jarvis, Meadowvale, Ontario, Canada, assignor to Grasslander Co. Limited, Milverton, Ontario, Canada Application November 16, 1955, Serial No. 547,206

4 Claims. (Cl. 146—117)

This invention relates to apparatus for cutting forage crops for feed and similar purposes, the said apparatus being provided in the form of a unit usable in various kinds of agricultural machinery.

Attempts have been made to provide a series of radially mounted straw cutting blades co-acting by pressure against a co-operating roller or drum. The blade pressed against the surface of the co-operating drum in the cutting action so that blade cutting edge and drum surface wear occurred to a serious degree.

Shortly after the middle of the last century and with the introduction of baling, the older types of manually operated straw cutters were abandoned in favour of devices used for breaking up stored bales for feed. A strong trend developed in the fine chopping of baled hay. One of the most efficient cutters for this purpose was a rotating blade to which the bale could be fed and which co-acted with a ledger blade to accomplish a shearing cutting action. This general method of cutting has found acceptance for the cutting of feed material to a fine size after a short curing period for the "direct feeding" of livestock.

Experiments of the applicant over a period of years have shown that the breaking up of feed substantially to a mulch or in any case into a mass of material having a large percentage of broken fibres, dust and the like, is unsatisfactory for feed purposes as compared with natural feed obtained by livestock in pasture. It has also been established that the older method abandoned substantially one hundred years ago, is highly satisfactory and represents the equivalent of pasture grazing in that the feed is chopped cleanly into approximately hand-sized lengths without crushing, breaking, bruising or powdering the feed.

In order to accomplish the desired chopping action, considerable investigation has shown that any of the popular shear cutting methods is substantially unsatisfactory. In contrast, a pressure cutting principle requires less power and effects negligible damage to the material being cut.

It is accordingly the main object of the invention to provide cutting apparatus for feed or the like adapted to cut material in accordance with a pressure cutting principle as contrasted with a shear cutting principle, said apparatus being of a form adapted for power driving and installation in various types of agricultural machinery.

It is another object of the invention to provide pressure cutting apparatus for hay or the like in which the maximum cutting force or pressure occurs substantially at a point along the cutting edge of the blade at any one time whereby to reduce the power required for cutting substantially to a minimum.

It is a further object of the invention to provide cutting apparatus for straw and the like which may be manufactured as a cutting unit including drive mechanism therefor as an assembly adapted to be installed in various classes of harvesters, combines and the like.

Other objects of the invention will be appreciated by a study of the following specification, taken in conjunction with the accompanying drawings.

In the drawings:

Figure 8 is a perspective view of a straw harvester unit employing the cutter unit of the invention; and Figure 9 is a partial perspective view of means for attaching the harvester unit of Figure 8 to a vehicle.

Figure 1:
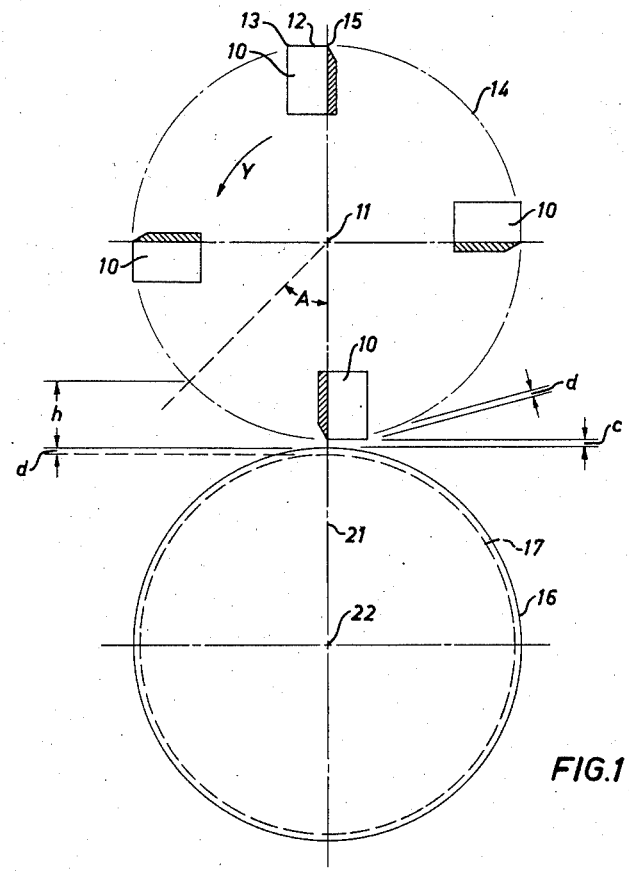
Figure 1 is a transverse sectional diagrammatic illustration of cutting blades of the invention adapted to co-act with a pressure roller.

A pressure cutting principle as modified in accordance with the invention is illustrated diagrammatically in Figure 1 wherein a plurality of flat rectangular cutting blades 10 are inclined longitudinally with respect to their common rotary axis 11. The cutting edges 12 are straight and at their outward ends 13, generate a path of rotation of greater diameter than the path of rotation 14 of the mid-point 15 of each cutting edge. It will be realized, therefore, that the loci of various points along the cutting edges 12 during rotation of the blade will be on paths of different radii. It may be assumed, by way of example, that the blades rotate about the axis 11 in the direction of the arrow Y and that the maximum difference of radius of rotation of the points in the cutting edge may be represented by the dimension $d$.

The line 16 is intended to represent the surface of a co-operating pressure cutting element such as a roller adapted to coact with the blades 10 at the point 15 of the cutting edge thereof. The inner line 17 represents the line of a surface of the co-operating roller or the like opposite the points 13 of the cutting blades and accordingly differs in radius by the dimension $d$ from the radius of the line 16. The dimension $c$ represents a minimum clearance spacing between the surface of the co-operating pressure cutting element and a blade cutting edge.

Figure 2:
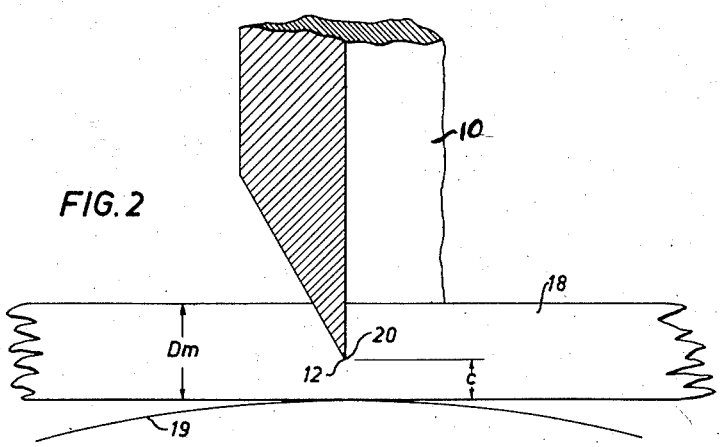
Figure 2 is a diagrammatic illustration of one preferred manner of cutting a shaft of feed material.

It will be apparent that material such as a shaft 18 of straw or the like of mean diameter $D_m$ shown in Figure 2 passing between the blade 10 and a co-operating pressure cutting element 19, is subjected substantially at a point 20 at spacing $c$ along the cutting edge of the blade 12 to a partial pressure cut sufficient to effectively sever the shaft while other points in the blade are spaced at a greater distance from the co-operating element 19 due to the longitudinal inclination of the blade 10. By this means, the pressure required for the cutting of a substantial amount of material is reduced to that necessary for the cutting of a small number of shafts impinged between only that part of the cutting blade which is in closest proximity to the co-operating element or roller 19. By this means also, the application of pressure to effect the necessary cutting action is prolonged through an arc of rotation of the blades which may be substantial, whereby to avoid vibration and to effect a smooth low power cutting action.

It has been determined that the power to drive a mechanism suitable for cutting straw as hereinafter set forth in more detail, is much more dependent upon the friction of the mechanism of associated conveyors and the like than upon the power consumption required to effect the necessary cutting action. In this respect, it is preferred that the crushing of straw or other feed be avoided. To obviate the crushing and bruising of material, it is preferred that the material fed to the cutting knives 10 be conveyed substantially freely at a depth substantially equaling the height $h$ at which the blade makes an angle A approximately equal to 45 degrees relative to a theoretical line 21 joining the axis of rotation 11 of the blades 10 and the axis of rotation 22 of the co-operating pressure cutting element 19. Accordingly, most of the material is cut before the cutting edge arrives at minimum spacing $c$ at which the remainder is effectively severed though the cutting edge does not engage the pressure supporting surface and is thus substantially free from wear.

Figure 3:
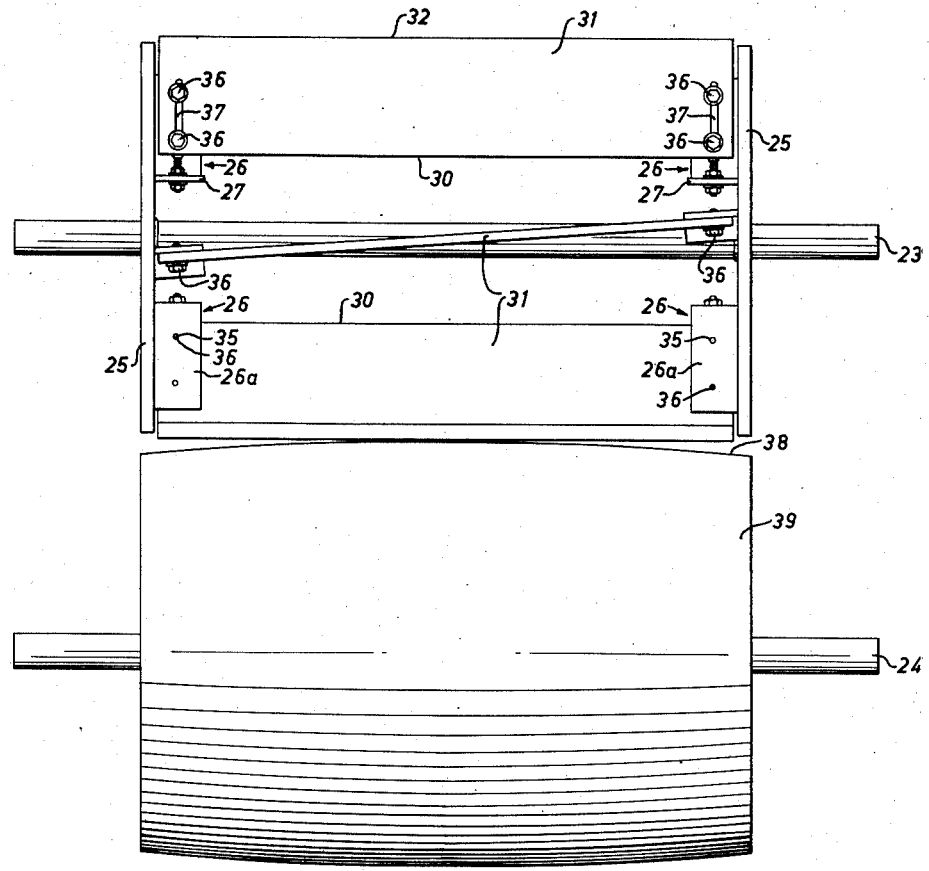
Figure 3 is an elevation of a preferred form of cutting apparatus of the invention.
Figure 5:
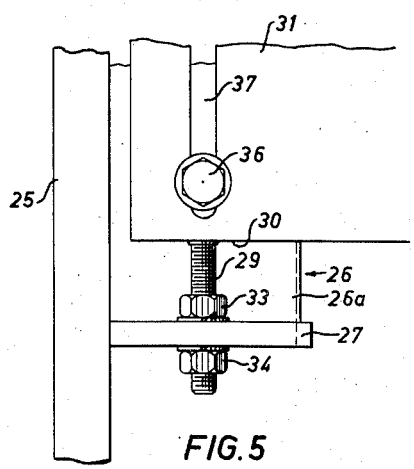
Figure 5 is an enlarged partial view of a preferred manner of mounting a blade for operation according to the invention.
Figure 4:
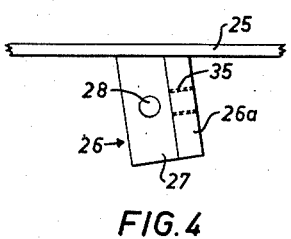
Figure 4 illustrates a plan view of a blade support fitting for the blades of the apparatus of Figure 3.

A suitable and preferred form of mechanical construction of cutting apparatus according to the invention is shown in Figures 3 to 5 and comprises the parallel spaced apart shafts 23 and 24 wherein shaft 23 carries supporting means 25 including brackets 26 welded thereto and having a supporting flange 26a inclined longitudinally preferably at an angle of about five degrees as shown in Figure 4 and having an inner flange 27 with a hole 28 adapted to accommodate the adjusting bolt 29 butt-welded to the inner edge 30 at each end of each cutting blade 31. The distance of the cutting edge 32 from the axis of shaft 23 is controlled by adjustment of the nuts 33 and 34 adapted to lock the bolt 29 with respect to the flange 27. Each bracket 26 embodies a pair of threaded holes 35 adapted to accommodate locking bolts 36 which pass through a slot 37 near each end of the blade to clamp the blade securely in the bracket after adjustment of the bolt 29. Assuming that each end of each blade is adjusted to rotate on the same radius, the cutting edges 32, if straight as preferred herein, will, upon rotation, generate a surface defining the matching contour of the co-operating surfaces 38 of the co-operating pressure roller 39. It will be observed that the outer surfaces 38 of roller 39 are shown as of matching contour of greater diameter in the mid region than at the outward edges and may be described herein as possessing longitudinal convexity, though of generally cylindrical form.

The adjustment of the blades as set forth, enables the operation of the cutting apparatus of the invention in such manner that the cutting edges do not touch the surfaces 38 of the co-operating roller 39. Thus, referring again to Figure 2, it will be observed that the cutting edge at the point 20 does not penetrate through the full dimension of the shaft of material 18 but only partially therethrough. Thus, for example, in the cutting of straw, it has been found that a clearance of about one-hundredth of an inch will effect satisfactory penetration of even the material adapted to be cut only at a point of closest relationship between the cutting blade and the co-operating roller 19. It has been found that highly satisfactory performance may be accomplished by a spacing of three one-thousandths of an inch with the obvious advantage that neither the cutting edge of the blade nor the surface of the roller can be worn by mutual engagement. Therefore, the life of the cutting edge of each blade and the roller surface is substantial and enables the cutting principle to be applied in a practical sense in service. It has been found that a cutting edge operating in the spaced manner specified will, unless damaged by the action of foreign bodies such as stones and the like, serve for substantially a full season without resharpening.

Figure 6:
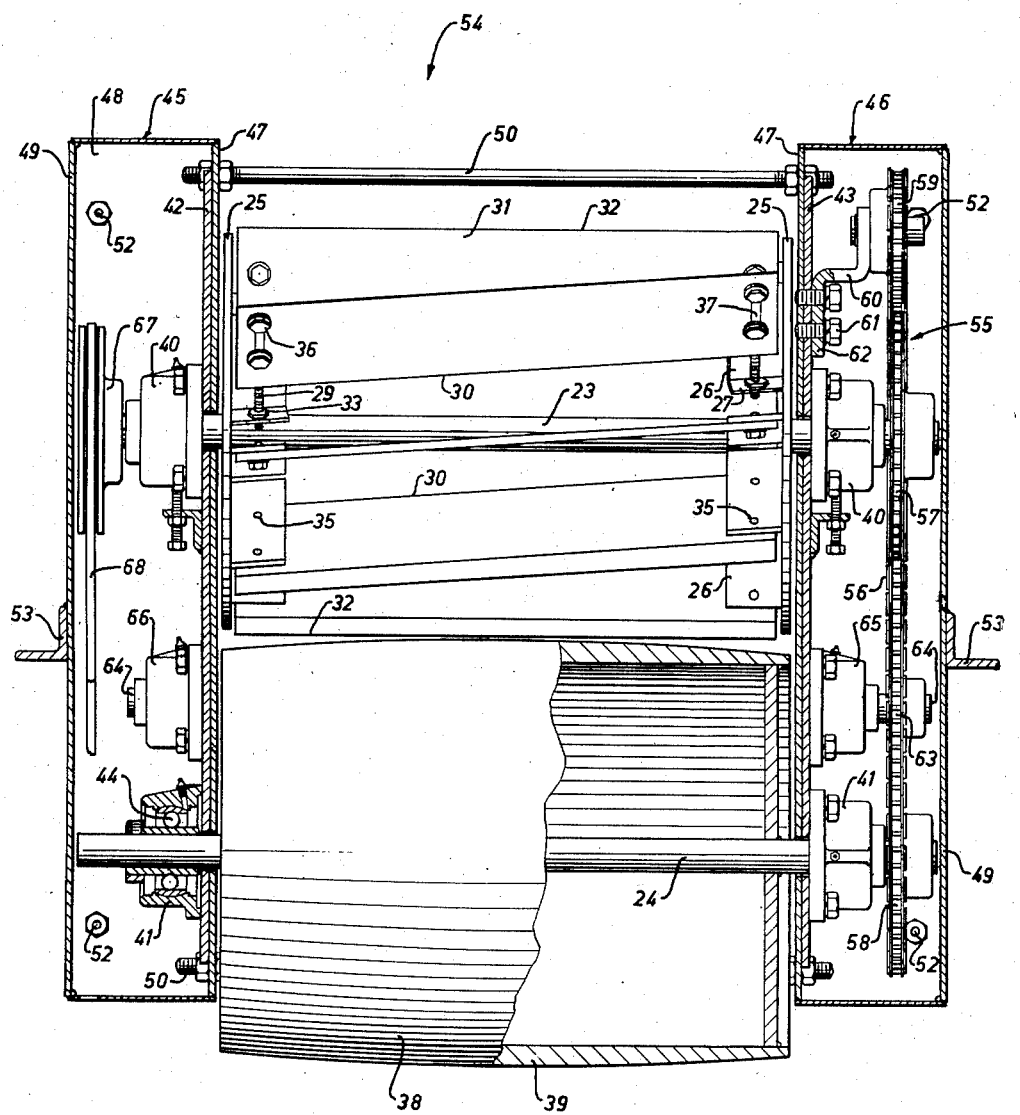
Figure 6 illustrates a feed cutting unit including drive means therefor according to the invention and employing the cutting means of Figures 3 to 5.
Figure 7:
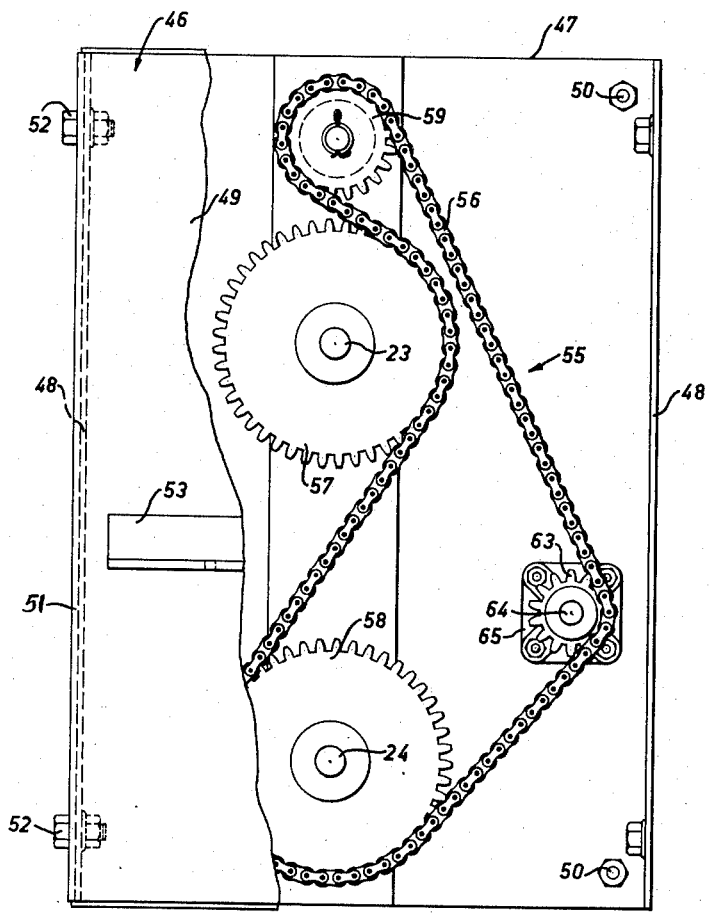
Figure 7 is a side elevation of the unit of Figure 6 with a portion of a side cover removed to reveal drive connection between the cutting components.

The invention contemplates the provision of a feed cutter unit of the general form shown in Figures 6 and 7 wherein the longitudinally inclined cutting blades 31 co-act with co-operating surfaces 38 of the co-operating pressure roller 39 or equivalent and are supported by the respective shafts 23 and 24, journalled in bearings 40 and 41 supported by side plates 42 and 43. The bearings 40 and 41 are preferably of the self-aligning type having self-aligning ball races 44 therein. Side plates 42 and 43 each maintain the shafts 23 and 24 in predetermined parallel spaced apart relation to support the side housings 45 and 46 comprising the inner walls 47, side walls 48 joined thereto and the removable cover 49. Housings 45, and 46 are maintained in predetermined spaced apart relation by suitable spacing bolts 50.

As shown in Figure 7, the covers 49 embody flanges 51 overlapping the side walls 48 of the housings 45 and 46 in each case, whereby the covers may be fastened to the side walls by the bolts 52. Each of the housings is of sufficient rigidity to support a mounting bracket 53 in the form of a metal angle used for the purpose of mounting the cutting unit 54 onto utilizing equipment as hereinafter disclosed in more detail. The cutters 31 and co-operating pressure means 39 are operatively related in drive relation by the drive means 55 in the side housing 46. While suitable belts, gearing or the like may be employed for this purpose, it is preferred to use a drive chain 56 passing over sprocket 57 on shaft 23 and about sprocket 58 on shaft 24 in a reverse direction whereby the sprockets are driven in opposite directions of rotation. An idler sprocket 59 is mounted on bracket 60, fastened by bolts 61 to side plate 43. It is desired to point out that the inner flange 62 of the bracket 60 preferably incorporates slots or enlarged holes in the region of the bolts 61 to permit adjustment of tension of the chain 56. A further sprocket 63 may serve as an idler and may be mounted on a stud shaft 64 on bracket 65 as shown in Figure 7. In this connection, however, it is preferred to extend the shaft 64 to a corresponding bearing 66 on side wall 42 and to support a drive roller therefrom for driving a conveyor belt as hereinafter noted.

The shaft 23 preferably carries a drive pulley 67 in housing 45 adapted to be connected by a driving belt 68 to a suitable drive motor or other source of power. A belt 68 extends through the side walls 48 of the housing 45 through suitable slots provided but not shown.

It will be seen in Figure 7 that sprockets 57 and 58 are identical and that the effective diameter of the cutting blades 31 and the co-operating pressure surfaces or roller 39 midway of the shafts 23 and 24 are identical and that it is preferred to operate the cutting blades and co-operating pressure surfaces at the same surface speed. A departure from synchronization of the speeds of the cutters and of the pressure roller causes a wiping of the blade edge on the co-operating pressure surface tending to damage the latter and deleteriously affecting the cleanliness of cut. By this means, breakage, crushing and bruising of the material being cut is avoided and the cutting edges of the blades experience a longer life and the co-operating pressure surfaces are less likely to damage.

As one illustration of the manner in which the feed cutting unit of the invention may be employed, a harvester attachment 69 embodying the cutter unit 54 of the invention is shown in Figure 8 for use with a vehicle 70 such as that disclosed in Figure 9. The harvester in the form shown, comprises side frames 71 rigidly joined by cross-pieces not shown and supporting the cutter unit 54 by the supporting flanges 53 thereof at an incline. The frame 71 carries a conventional straw pickup unit 72 at the forward end hinged to the frame for free action over an irregular ground surface and is therefore supported at its outward extremities by the wheels 73. The pickup unit 72 feeds to the upwardly converging trough 74 having the rotating fingers 75 on driven shaft 76 operatively related to the cutter shaft 23 by a suitable belt (not shown). The straw passes to the cutter unit 54 and is severed into lengths preferably of about hand length and thence passes to a conveyor 77 driven by the conveyor shaft 64 (Figure 7). Conveyor 77 is supported on suitable idler rollers (not shown) on frame 78 having a partial cover 79 and pivoted on the axis of the shaft 64. The upwardly inclined conveyor structure 80 is restrained in its pivoting action by restraining spring 81 connecting between the frame 78 thereof and the frame 71 of the harvester on the upwardly extending posts 82 which embody the connecting bolts 83.

Suitable mechanism is provided for attaching the harvester unit 69 to the vehicle 70 and generally comprises the uprights 84 rigidly fastened to the bumper 85 or adjacent frame portions of the vehicle 70. The uprights vertically slidably carry the forwardly extending engaging arms 86 adapted to be raised by actuation of the hydraulic cylinder 87 operatively connected to a conventional hydraulic equipment operating system (not shown) of the vehicle 70.

Accordingly, vehicle 70 is merely driven forward to a position at which the inwardly extending pins 88 adjacent posts 82 of frame 71 are engaged in the locking recess or cradle portions 89 of arms 86. At this point of operation, the hydraulic cylinder 87 is actuated by a conventional control within the vehicle and the arms 86 are raised, thus raising the frame 71 and drawing the lower portion thereof rearwardly for engagement of the locking arms 90 behind the lower extremities of the bumper 85 or the like on vehicle 70. In the finally locked position, the inwardly extending locking pins 88 are also engaged by the outwardly and downwardly extending locking collars 91 on the uprights 84 in conjunction with attaching the harvester unit to the vehicle 70 as set forth. The operator may draw the free end 92 of the conveyor 80 into locking engagement with the locking bar 93 adapted to be engaged by releasable locking mechanism 94 of any suitable design. The hydraulic ram 95 operated from within vehicle 70 is used for lifting pickup unit 72 free of the ground surface by engagement of the nose fitting 96 with saddle 97 of bifurcated arm 98 pivotally extending rearwardly in guides 99 of frames 71. The cutter unit 54, pickup unit 72 and conveyors may be powered by operative connection to the power takeoff connection 100 of vehicle 70 or the harvester frame may carry an independent drive motor of light horsepower to power the harvester unit alone.

It will be apparent that the cutter unit 54 may be installed in various other crop processing machinery such as combines and the like. The invention also contemplates the use of a cutter unit substantially as set forth to receive material cut by a conventional cutter bar and to be thereafter cut by the cutter unit and returned to the ground surface for natural curing in a windrow. While in such application it may be desirable to crush the material to accelerate natural curing processes, it is contemplated herein that such crushing operation will take place after the material is cut by the cutter unit of the invention.

What I claim as my invention is:

1. Apparatus for cutting straw and like forage material comprising in combination: a shaft; a plurality of radially disposed blades on said shaft; a supporting housing for each end of said shaft including bearing means rotatably supporting said shaft; a separable rigid cover forming a part of each housing and serving as the sole means of support for said housing; means maintaining said housings in predetermined spaced apart relationship to dispose said cutting blades therebetween; a second shaft; bearing means in said housings supporting said second shaft in parallel spaced apart relation to said first shaft; means on said second shaft rotatable therewith for cooperative cutting motion toward said cutting blades upon rotation of the latter on said first shaft; means in one of said housings operatively relating said shafts effecting upon rotation of one shaft, counter rotation of the other shaft; and means for removably fastening each housing to the rigid cover thereof, whereby said apparatus is separable as a unit from said rigid housing covers serving as the sole supporting means therefor.

2. Apparatus for cutting straw and like forage material comprising in combination: a rotatable cutter shaft; supporting means extending radially outwardly from said shaft and spaced longitudinally of the latter; brackets on each supporting means each having a supporting flange extending in a direction toward the other supporting means but inclined longitudinally with respect to the rotational axis of said shaft; a flat pressure cutting blade mountable between said supporting means on said brackets thereof in engagement with the supporting flanges of said brackets and embodying an outwardly directed cutting edge having terminal ends; means for adjusting said pressure cutting blade to dispose the outwardly directed cutting edge thereof equidistant at the terminal ends of the latter from the rotational axis of said shaft; means for removably clamping said blade to said brackets; a pressure cutting drum adapted for rotation about an axis parallel to the rotational axis of said cutting blade; a pressure cutting supporting surface on said drum; a housing for each end of said cutter shaft and including bearing means therefor; means maintaining said housings in predetermined spaced apart relationship to dispose said cutting blade and supporting means therefor therebetween; a second shaft extending between said housings and supported on bearing means in the latter serving as an axis for said pressure cutting drum and disposed in parallel spaced apart relationship to said cutter shaft; means in one of said housings operatively relating said shafts effecting upon rotation of one shaft, counter rotation of the other shaft; and a separable rigid cover forming a part of each housing and serving as the sole means of support for said apparatus whereby said apparatus may be removed from said covers for servicing.

3. A cutting unit mountable on the frame of an agricultural implement and useful for cutting forage material and the like and comprising in combination: rotatable pressure cutting mechanism including parallel spaced apart shafts therein; spaced apart side housings including bearing means supporting said shafts; a rigid cover member forming a part of each side housing; means on each cover member for mounting the same on an implement frame; and means for detachably fastening said side housings to the rigid covers thereof whereby said covers serve as the sole supporting means for said unit, and said unit is removable for servicing from said supporting side covers.

4. A cutting unit mountable on the frame of an agricultural implement and useful for cutting forage material and the like and comprising in combination: rotatable pressure cutting mechanism including parallel spaced apart shafts therein; spaced apart side housings including bearing means supporting said shafts; a rigid cover member forming a part of each side housing; means on each cover member for mounting the same on an implement frame; means for detachably fastening said side housings to the rigid covers thereof whereby said covers serve as the sole supporting means for said unit, and said unit is removable for servicing from said supporting side covers; and operatively relating drive means for said shafts within one of said housings and removable with said cutting unit upon separation of the latter from said housing covers.

References Cited in the file of this patent
UNITED STATES PATENTS

| None | Greene | Aug. 8, 1833 |
| 61,933 | Gale | Feb. 12, 1867 |
| 2,224,948 | Bloomquist | Dec. 17, 1940 |
| 2,355,358 | Anderson | Aug. 8, 1944 |
| 2,399,529 | Willits | Apr. 30, 1946 |
| 2,545,520 | Kinkead | Mar. 20, 1951 |
| 2,716,318 | Skromme | Aug. 30, 1955 |

UNITED STATES PATENT OFFICE
CERTIFICATE OF CORRECTION

Patent No. 2,829,690

April 8, 1958

James Gordon Jarvis

It is hereby certified that error appears in the above numbered patent requiring correction and that the said Letters Patent should read as corrected below.

In the grant, lines 2 and 3, for "assignor to Grasslander Co. Limited, of Milverton, Ontario, Canada," read -- assignor, by mesne assignments, to Grasslander (1957) Limited, of Milverton, Ontario, Canada, -- line 12, for "Grasslander Co. Limited, its successors" read -- Grasslander (1957) Limited, its successors --; in the heading to the printed specification, lines 4 to 6, for "assignor to Grasslander Co. Limited, Milverton, Ontario, Canada" read -- assignor, by mesne assignments, to Grasslander (1957) Limited, Milverton, Ontario, Canada --.

Signed and sealed this 18th day of November 1958.

(SEAL)

Attest:
KARL H. AXLINE

Attesting Officer

ROBERT C. WATSON
Commissioner of Patents